Patented Aug. 8, 1933

1,921,334

UNITED STATES PATENT OFFICE 1,921,334

TRIARYLMETHANE DYESTUFF

Ottmar Wahl, Leverkusen-I. G. Werk, Werner Müller, Cologne-on-the-Rhine, Adolf Kohn, Leverkusen-I. G. Werk, and Ernst Teupel, Leverkusen-Wiesdorf, Germany, assignors to General Aniline Works, Inc., New York, N. Y., a Corporation of Delaware No Drawing. Application August 6, 1932, Serial No. 627,808, and in Germany September 12, 1931

7 Claims. (Cl. 260—68)

The present invention relates to new dyestuffs of the triarylmethane series, more particularly it relates to dyestuffs which in the carbinol form may be represented by the probable general formula:

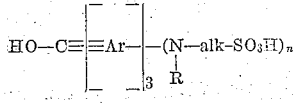

wherein "Ar" stands for a radical of the benzene or naphthalene series, for instance, for a benzene or naphthalene nucleus which may be substituted by alkyl, such as methyl and ethyl, alkoxy, such as methoxy and ethoxy, halogen, the amino group, a substituted amino group, such as a dialkyl amino group or a sulfonic acid group, R stands for hydrogen, alkyl, aryl or aralkyl, for instance for methyl, ethyl, propyl, butyl or benzyl and phenyl, wherein the nuclei may be substituted, for instance, by halogen, methyl, ethyl, methoxy, ethoxy or a sulfonic acid group, "alk" stands for an alkylene group, such as a methylene, ethylene, propylene or butylene group, and "n" stands for one of the numbers one to three.

Our new dyestuffs are obtainable according to the known methods of preparing dyestuffs of the triarylmethane series, for example, by starting with an aromatic aminosulfonic acid of the general formula:

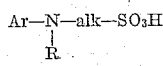

wherein "Ar", R and "alk" mean the same as stated above, condensing the same with a suitable aldehyde to form the corresponding leucotriarylmethane compound and oxidizing the same to form the dyestuff.

Another method of preparing our dyestuffs resides in causing a halogenalkylsulfonic acid to act upon a dyestuff of the triarylmethane series containing at least one aromatic amino group.

Finally the new dyestuffs are obtainable by reacting with an alkali metal sulfite at an elevated temperature upon a triarylmethane dyestuff containing at least once the esterified group R—N—alk—OH, wherein R and "alk" mean the same as stated above. In this manner it is possible to synthesize triarylmethane dyestuffs containing besides the aminoalkylsulfonic acid group or groups also aminohydroxyalkyl groups. This can be achieved by starting with such triarylmethane compounds of the kind referred to in which the aminohydroxyalkyl groups are only partially esterified or, by reacting upon the triarylmethane dyestuffs in which all aminohydroxyalkyl groups are esterified with a quantity of an alkali metal sulfite insufficient for transforming the esterified aminohydroxyalkyl groups into aminosulfalkyl groups.

Instead of producing the group N—R—alk—SO₃H group characteristic for our new dyestuffs in triarylmethane dyestuffs containing at least one aromatic amino group or an esterified aminohydroxyalkyl group, or synthesizing the dyestuffs with such compounds containing already the characteristic group, there may be started with a suitable diarylmethane compound in which before or after the synthesis of the triarylmethane dyestuff according to known methods there is produced our characteristic group.

All the methods of preparing our new dyestuffs are equivalent to each other.

If there are used the leuco compounds of the triarylmethane dyestuffs as starting materials, or if in the process of manufacture our new dyestuffs are obtained in the leuco form, for instance, by the action of alkali metal sulfite, they can be transformed into the dyestuffs by oxidation in the known manner.

Our new dyestuffs are generally water soluble, dark, metallic lustrous powders, dyeing animal fibers, such as wool or silk, generally reddish-violet to blue to green shades. Compared with triarylmethane dyestuffs of similar constitution, for example, with those containing instead of the sulfoalkyl a sulfobenzyl radical, they generally are distinguished by an increased solubility in water and an improved clearness of the shades obtained therewith.

The invention is illustrated by the following examples, without being limited thereto:

*Example 1.*—1 mol. of p-diethylaminobenzaldehyde is heated with 2 mols. of o-tolyltaurine in a weakly sulfuric acid solution, until the condensation is complete. The leuco compound is oxidized either after previously isolating by salting out with sodium sulfate or directly in the condensation solution, for example by adding to the solution of the leuco acid prepared from 18 grams of p-diethylaminobenzaldehyde, 18 g. of sulfuric acid, 1 g. or acetic acid and 16 g. of lead peroxide, while stirring.

The reddish violet dyestuff formed having in its carbinol form the following formula:

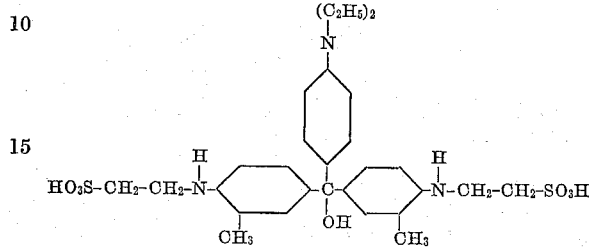

is isolated by salting out with sodium sulfate.

*Example 2.*—16 g. of the sodium salt of ethyl-phenyltaurine are heated for 3 hours in 350 ccs. of water, 5 grams of sulfuric acid and 3,5 grams of formaldehyde of 33% strength, and the diphenylmethane compound formed is oxidized with 4,5 g. of sulfuric acid and 8 g. of sodium bichromate with the addition of 5 g. of diethylaniline to form a bluish-violet dyestuff of the probable formula:

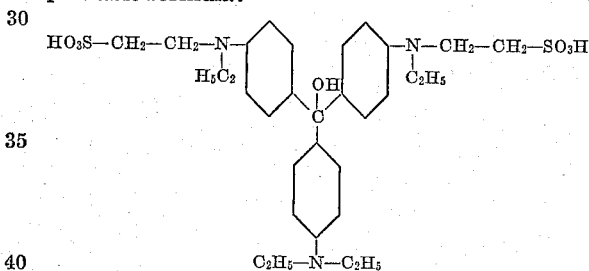

The same dyestuff is obtainable by condensing 1 molecular proportion of p-diethylaminobenzaldehyde with 2 molecular proportions of phenylethyltaurine in weakly acid solution, and oxidizing the leuco compound formed, for example, with 1 molecular proportion of lead peroxide and hydrochloric acid.

*Example 3.*—Tetramethyldiaminodiphenylmethanehydrol and m-tolylethyltaurine in molecular proportions are heated in aqueous weakly acid solution, until the hydrol has disappeared. The leuco compound formed is oxidized with 1 molecular proportion of lead peroxide in hydrochloric acid solution to form a bluish-violet dyestuff which can be dyed according to the method known for dyeing alkali violet. In its carbinol form the dyeing has the following formula:

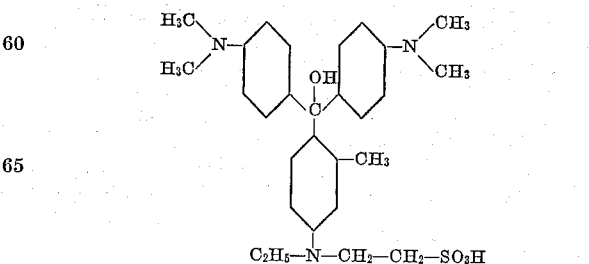

*Example 4.*—1 molecular proportion of tetraethyl-4.4'-diamino-3''-aminotriphenylmethane is heated at 100° C., one molecular proportion of the sodium salt of chloroethanesulfonic acid, and the mass is stirred until solidification has taken place. The leuco formed is oxidized according to known methods to a bluish-green triarylmethane dyestuff. In its carbinol form the dyestuff has the following formula:

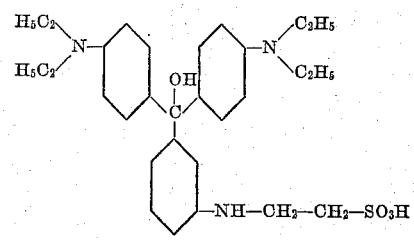

*Example 5.*—3 molecular proportions of butyl-phenyltaurine are heated with 1 molecular proportion of formaldehyde in aqueous weakly acid solution, until the formaldehyde has disappeared. By the addition of 2 molecular proportions of chromic acid is oxidized to form a dyestuff having in the carbinol form the probable formula:

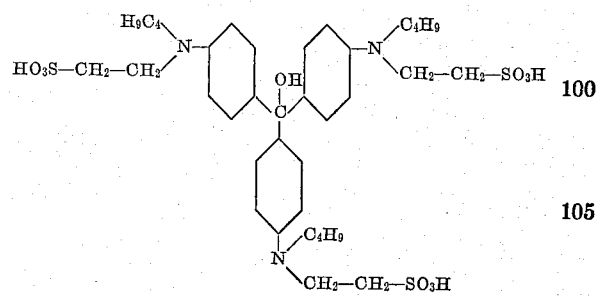

It dyes the animal fiber, for example wool, very clear bluish-violet shades.

*Example 6.*—1 molecular proportion of p-sulfobenzaldehyde is condensed with 2 molecular proportions of butyl-m-tolyltaurine; the leuco compound formed is oxidized to a green dyestuff. 1 part of this dyestuff is heated with 2 parts of p-phenetidine at 100° C. until the green color has turned to blue (several hours). The melt is poured into water, and the dyestuff is precipitated by the addition of hydrochloric acid. In form of its alkali metal salt it is easily soluble in water and dyes wool and silk greenish-blue shades. In the carbinol form it has the following formula:

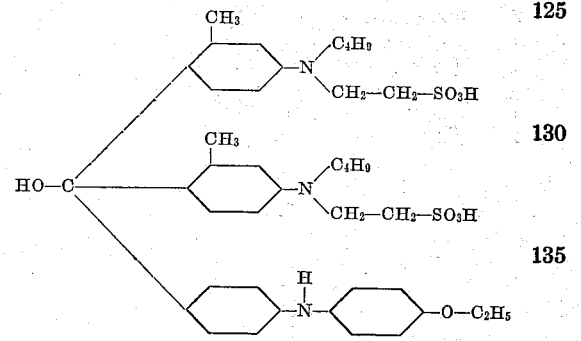

When performing the second condensation with aniline instead of p-phenetidine a dyestuff dyeing redder is obtained, while, when using o-toluidine instead of p-phenetidine, there is obtained a dyestuff yielding still more redder shades.

*Example 7.*—2 molecular proportions of benzyl-m-tolyltaurine and 1 molecular proportion of o-chlorobenzaldehyde are heated in aqueous suspension until the benzyl-m-tolyltaurine has disappeared. The leuco dyestuff is oxodized with lead peroxide and hydrochloric acid to form the dyestuff which dyes wool clear green shades. In the carbinol form it has the following formula:

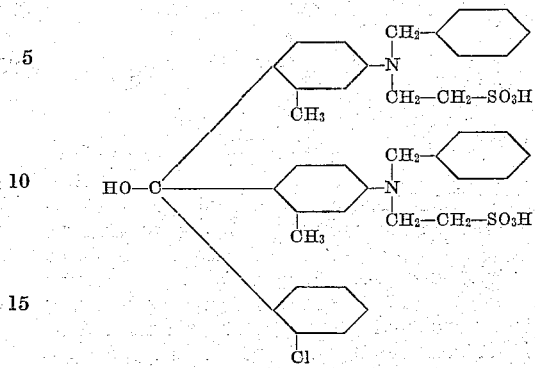

*Example 8.*—1 molecular proportion of p-diethylamino-benzaldehyde is condensed in weakly acid solution with 2 molecular proportions of benzylphenyltaurine. The leuco compound formed is oxidized with potassium bichromate and sulfuric acid; the dyestuff dyes wool clear violet shades. In the carbinol form it has the following formula:

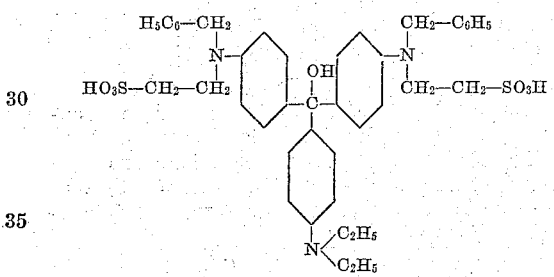

*Example 9.*—63 parts by weight of an aqueous paste of Michler's hydrol, corresponding to 27 parts by weight of hydrol, are dissolved in 100 parts by weight of a 10% aqueous sulfuric acid. Thereto is added a suspension of 33 parts by weight of diphenyltaurine in 25 parts by weight of a 20% aqueous sulfuric acid and 20 parts of hot water. Condensation to form the leuco compound is performed on the boiling water bath. The reaction mass is diluted with water and oxidized in the usual manner to form the dyestuff. After isolation and purification it is obtained as a blue powder, dyeing the animal fiber from a mineral acid bath reddish-blue shades. In the carbinol form the dyestuff has the following formula:

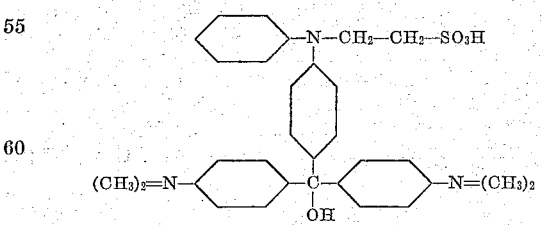

*Example 10.*—67 parts by weight of the sodium salt of the sulfuric acid ester of di-(2-chloro-4-[N-hydroxyethylbutylamino]phenyl)-1-methane of the formula:

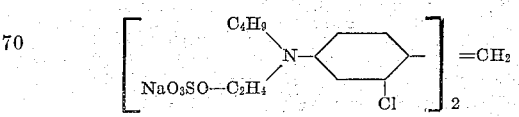

obtainable for example by introducing the corresponding methane compound into sulfuric acid of 66° Bé., separating and neutralizing with an alkali in the usual manner, are heated in a closed vessel with 50 to 100 parts by weight of water and 100 parts by weight of crystallized sodium sulfite at a temperature of 130° C. The reaction is complete after about 6 hours. The reaction mass is dissolved in hot water from which, on cooling, the bulk of the sodium salt of the di-(2-chloro-4-[sulfoethylbutylamino]phenyl)-1-methane separates in form of small colorless crystals. The separation can be completed by the addition of aqueous saturated common salt solution. The diphenylmethane compound thus obtained is then oxidized to form the corresponding hydrol and is condensed with diethylaniline in the usual manner. The dyestuff thus obtained has in the carbinol form the following formula:

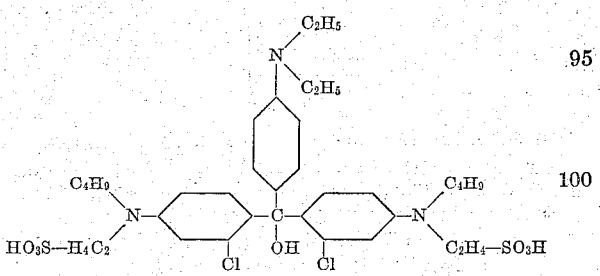

*Example 11.*—The aqueous paste of the sodium salt of the sulfuric acid ester prepared from 50 parts by weight of the leuco base of the constitution:

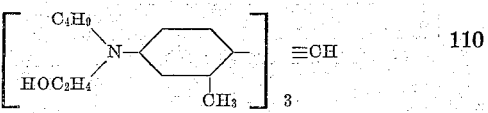

is heated in a closed vessel at a temperature of 150° C. with 150 parts by weight of sodium sulfite for 4 to 5 hours. The mass is worked up as described in Example 10. Thus is obtained the sodium salt of the leuco acid of the following formula:

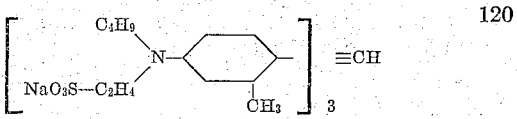

in form of water soluble colorless crystals. Also the free acid is soluble in water and acids. By oxidation according to the usual methods, for example in acid solution with lead peroxide, a blue dyestuff is obtained, dyeing the animal fiber clear greenish-blue shades.

When acting upon the sulfuric acid ester described in paragraph 1 with less sodium sulfite, for example, about 75 parts by weight, there is obtained a leuco acid still exerting strongly basic properties. In this case probably only one ester group has been transformed into the sulfonic acid group, while the other sulfonic acid groups have been saponified. The blue dyestuff obtained therefrom by oxidation has only weakly acid properties.

*Example 12.*—The moist sodium salt of the sulfuric acid ester of 60 parts by weight of a leuco base obtainable by condensation of 1 mol. of o-chlorobenzaldehyde with 2 mols. of N-hydroxypropylbutylaniline, is heated with 120 parts by weight of crystallized sodium sulfite for 6 hours to a temperature of 130° C. The reaction mass is worked up as described in Example 10.

In this manner there is obtained the sodium salt of a leuco compound containing two propane-sulfonic acid residues. By oxidizing in the usual manner to form the dyestuff there is obtained a green dyestuff, which in the carbinol form corresponds to the following formula:

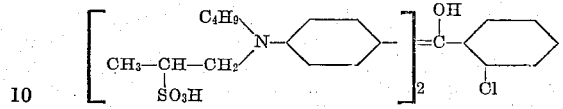

*Example 13.*—72 parts by weight of the sulfuric acid ester (sodium salt) of the dyestuff having the probable formula:

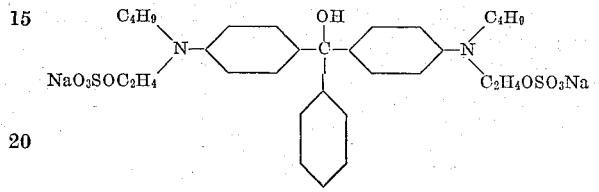

are heated in a closed vessel with 150 parts by weight of crystallized sodium sulfite for 8 hours at a temperature of 140° C. The weakly violet colored reaction mass is poured into water and rendered acid. After blowing air through the solution, until the sulfuric acid has disappeared, the dyestuff reduced in the reaction is oxidized in the usual manner. By salting out there is obtained the di-(N-sulfoethylbutylamino)-triphenylmethane dyestuff in form of a reddish bronce resine, dyeing the animal fiber clear green shades. It is easily soluble in water and has in the carbinol form the following formula:

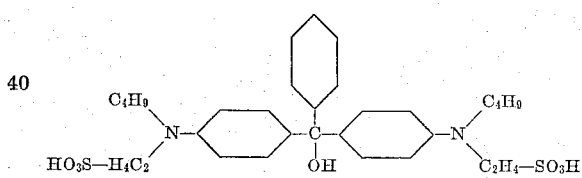

*Example 14.*—60 parts by weight of the dyestuff of the probable formula:

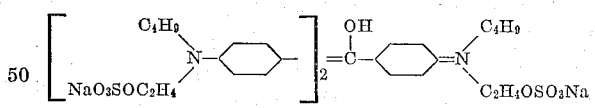

are heated with 100 parts by weight of water and 150 parts by weight of crystallized sodium sulfite for 4 to 5 hours at a temperature of 120–130° C. The reaction mass is worked up as described in Example 10. There is obtained a bluish-violet dyestuff which in its properties is identical to that obtainable according to Example 5.

*Example 15.*—54 parts of butylphenylamino-propane-sulfonic acid of the probable constitution:

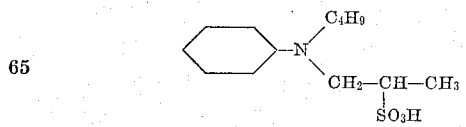

are condensed in the usual manner to the leuco-compound with 200 parts of water and 15 parts of o-chlorobenzaldehyde. By neutralizing with alkali and salting out of the alkaline solution there is obtained the crystallized sodium salt, and, when oxidizing in the usual manner to the dyestuff there yields an easily soluble dyestuff, dyeing the animal fiber clear green shades. In its carbinol form it has the probable formula:

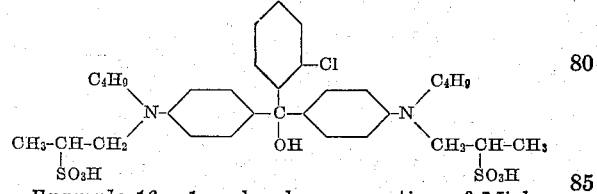

*Example 16.*—1 molecular proportion of Michler's hydrol is heated for about 1 hour in aqueous weakly sulfuric acid solution with 1 molecular proportion with α-naphthyltaurine. The leuco compound formed is separated by neutralizing and is oxidized with lead peroxide and hydrochloric acid. The dyestuff having in the carbinol form probably the following formula:

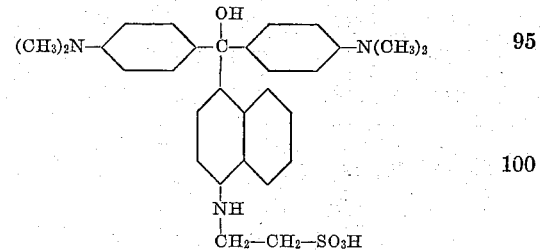

dyes wool or tanned cotton blue shades.

*Example 17.*—The dyestuff obtained by condensing 1 molecular proportion of o-sulfobenzaldehyde and 2 molecular proportions of butylphenyltaurine in acid solution, followed by oxidation, having in the carbinol form the following formula:

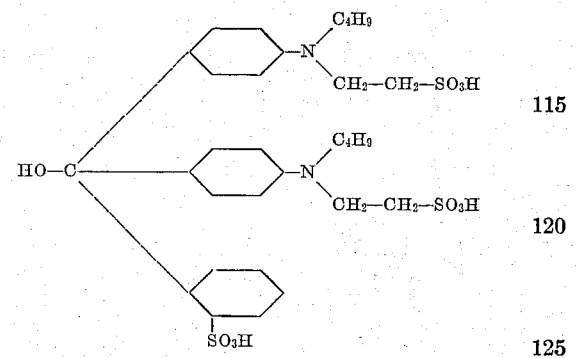

dyes wool and silk clear greenish-blue shades fast to alkalies.

*Example 18.*—The dyestuff obtained by condensing two molecular proportions of butylphenyltaurine with 1 molecular proportion of formaldehyde in weakly acid solution and oxidizing the diphenylmethane compound formed with sulfuric acid and potassium bichromate in the presence of 1 molecular proportion of diethylaniline, having in the carbinol form the following formula:

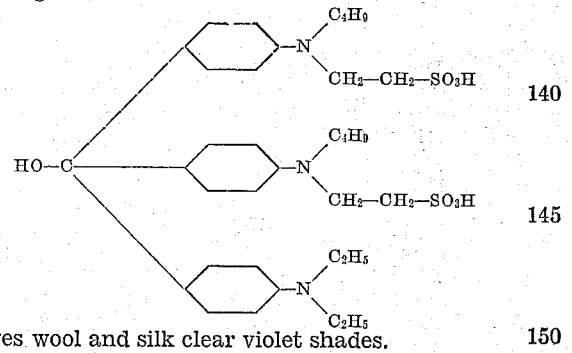

dyes wool and silk clear violet shades.

*Example 19.*—The dyestuff obtained by condensing 1 molecular proportion of p-chlorobenzaldehyde and 2 molecular proportions of butylphenyltaurine followed by oxidation, is heated with the same quantity of p-phenetidine at 100° C. for 3 hours. The excess phenetidine is dissolved by the addition of dilute hydrochloric acid and the dyestuff having in the carbinol form the formula:

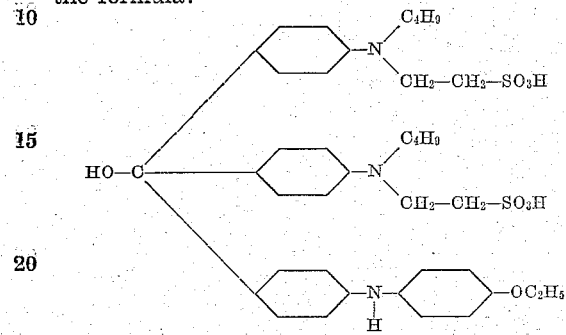

is isolated from its solution in the usual manner. It is in form of its alkali metal salts easily soluble in water, dyeing wool and silk brilliant reddish-blue shades.

A dyestuff dyeing somewhat redder is obtained by substituting the p-phenetidine by aniline, by substituting the p-phenetidine by o-toluidine, a dyestuff dyeing still more red is obtained.

*Example 20.*—The dyestuff obtained by condensing 1 molecular proportion of p-diethylaminobenzaldehyde with 2 molecular proportions of butyl-m-tolyltaurine in weakly acid solution, and oxidizing the leuco compound formed, for example, with 1 molecular proportion of lead peroxide and hydrochloric acid. In the carbinol form the dyestuff has the following formula:

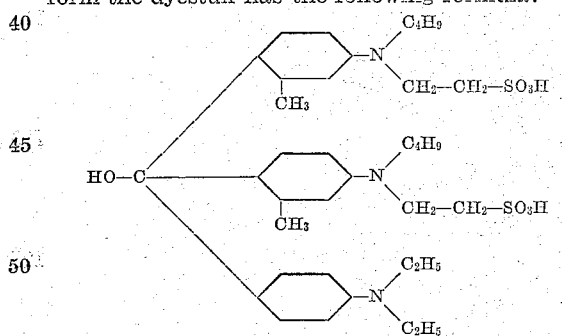

It dyes wool and silk very clear greenish-blue shades.

We claim:

1. Triarylmethane dyestuffs having in the carbinol form the probable general formula:

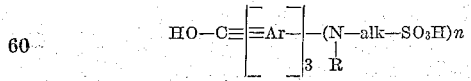

wherein "Ar" stands for a radical of the benzene or naphthalene series, R stands for hydrogen, alkyl, aryl or aralkyl, "alk" stands for an alkylene group and "$n$" stands for one of the numbers one to three, being in form of their alkali metal salts dark metallic lustrous powders, dyeing animal fibers generally reddish-violet to blue to green shades.

2. Triarylmethane dyestuffs having in the carbinol form the probable general formula:

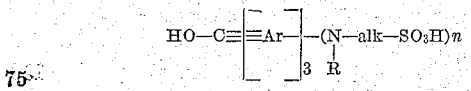

wherein "Ar" stands for a radical of the benzene series, R stands for hydrogen, alkyl, aryl or aralkyl, "alk" stands for an alkylene group, and "$n$" stands for one of the numbers one to three, being in form of their alkali metal salts dark metallic lustrous powders, dyeing animal fibers generally reddish-violet to blue to green shades.

3. Triarylmethane dyestuffs having in the carbinol form the probable general formula:

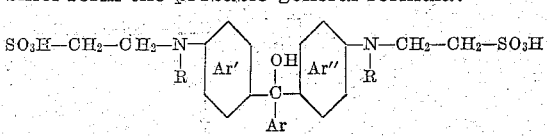

wherein the benzene nuclei Ar' and Ar'' may be substituted by alkyl, Ar stands for a radical of the benzene series and R stands for benzyl or an alkyl group, being in form of their alkali metal salts dark metallic lustrous powders, dyeing animal fibers generally reddish-violet to blue to green shades.

4. Triarylmethane dyestuffs having in the carbinol form the probable general formula:

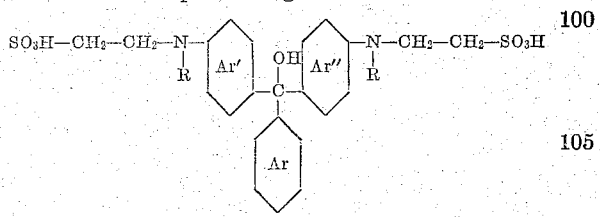

wherein the benzene nuclei Ar' and Ar'' may be substituted by methyl, the benzene nucleus Ar may be substituted by substituents selected from the group consisting of dialkylamino, phenylamino, alkoxy, halogen and the sulfonic acid group, and R stands for benzyl or an alkyl group, being in form of their alkali metal salts dark metallic lustrous powders, dyeing animal fibers generally reddish-violet to blue to green shades.

5. The triarylmethane dyestuff having in the carbinol form the following formula:

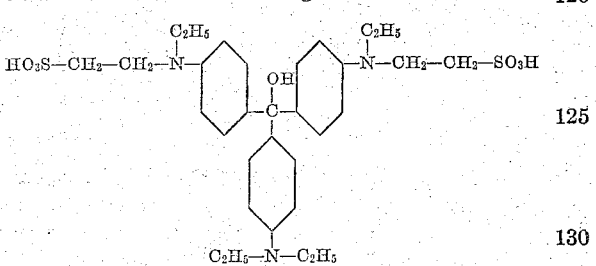

dyeing wool and silk violet shades.

6. The triarylmethane dyestuff having in the carbinol form the following formula:

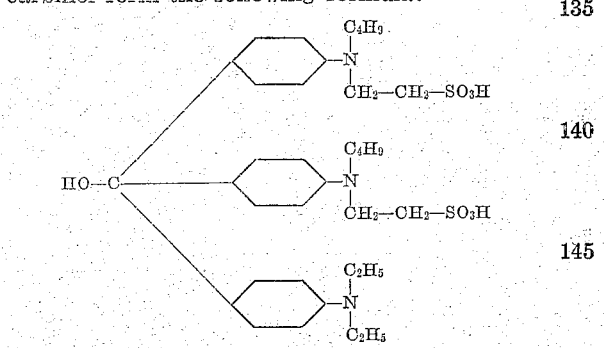

dyeing wool and silk clear violet shades.

7. The triarylmethane dyestuff having in the carbinol form the following formula:
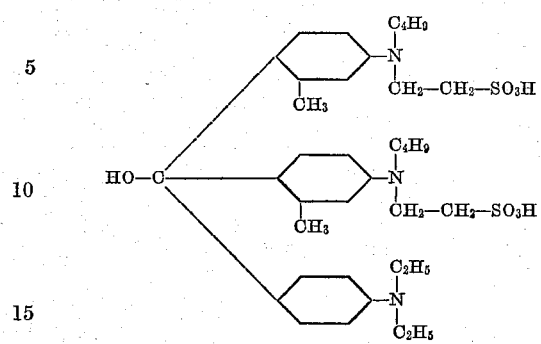
dyeing wool and silk very clear greenish-blue shades.
OTTMAR WAHL.
WERNER MÜLLER.
ADOLF KOHN.
ERNST TEUPEL.